(12) United States Patent
Burch et al.

(10) Patent No.: US 8,254,161 B2
(45) Date of Patent: Aug. 28, 2012

(54) DEVICE THAT CAN BE RENDERED USELESS AND METHOD THEREOF

(75) Inventors: Kenneth R. Burch, Austin, TX (US); William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 900 days.

(21) Appl. No.: 12/195,555

(22) Filed: Aug. 21, 2008

(65) Prior Publication Data

US 2010/0050275 A1 Feb. 25, 2010

(51) Int. Cl.
*G11C 11/00* (2006.01)

(52) U.S. Cl. ........ 365/158; 365/171; 365/173; 365/157; 365/163

(58) Field of Classification Search ............. 365/8, 16, 365/33, 55, 56, 60, 61, 65, 66, 97, 145, 157, 365/158, 163; 326/8; 726/34
See application file for complete search history.

(56) References Cited

U.S. PATENT DOCUMENTS

| | | | |
|---|---|---|---|
| 6,058,071 | A | 5/2000 | Woodall et al. |
| 6,580,370 | B2 | 6/2003 | Fournel |
| 7,692,956 | B2 * | 4/2010 | Sugibayashi et al. ......... 365/158 |
| 7,712,147 | B2 * | 5/2010 | Lenssen et al. ................. 726/34 |
| 7,848,135 | B2 * | 12/2010 | Elmegreen et al. ........... 365/157 |
| 2006/0179490 | A1 * | 8/2006 | Lenssen et al. ................. 726/34 |
| 2007/0279969 | A1 | 12/2007 | Gabelich |

OTHER PUBLICATIONS

Durlam, M. et al.; "MRAM Memory for Embedded and Stand Alone Systems (Invited)"; ICICDT07; 2007; pp. 1-4; IEEE.
Engel, B. N. et al.; "A 4-Mb Toggle MRAM Based on a Novel Bit and Switching Method"; IEEE Transactions on Magnetics; Jan. 2005; pp. 132-136; vol. 41, No. 1; IEEE.
Andre, Thomas W. et al.; "A 4-Mb 0.18-um 1T1MTJ Toggle MRAM With Balanced Three Input Sensing Scheme and Locally Mirrored Unidirectional Write Drivers"; IEEE Journal of Solid-State Circuits; Jan. 2005; pp. 301-309; vol. 40, No. 1; IEEE.
Akerman, Johan et al.; "Demonstrated Reliability of 4-Mb MRAM; IEEE Transactions on Device and Materials Reliability"; Sep. 2004; pp. 428-435; vol. 4, No. 3; IEEE.
Murph; "Philips self-destructing MRAM on the way"; http://www.engadget.com/2006/09/25/philips-self-destructing-mram-on-the-way/; Sep. 25, 2006; 1 Pg; engadget.com.
"SBIR Phase I: Zero-Remanence Tamper-Responsive Cryptokey Memory", Award Abstract #0539675 (http://www.nsf.gov/awardsearch/showAward.do?AwardNumber=0539675); Nov. 10, 2005; 2pp; National Science Foundation.

\* cited by examiner

*Primary Examiner* — Vibol Tan
(74) *Attorney, Agent, or Firm* — Joanna G. Chiu; Jonathan N. Geld

(57) ABSTRACT

In one form a device having an integrated circuit is rendered useless by providing a piezo element coupled to a voltage terminal of the integrated circuit of the device. A render useless signal is generated by any of several ways. The piezo element, in response to the render useless signal, renders in any one of several ways the device to be rendered useless. The piezo element, when disturbed, generates a voltage which is provided to the voltage terminal of the integrated circuit, the voltage being sufficiently high to render useless at least a portion of the integrated circuit. In other forms the render useless signal renders MRAM circuitry within the device useless by moving a magnetic field across the MRAM circuitry to vary resistance of memory reference cells. In one form the magnetic field is moved by spring-loading or pivoting a magnet that is released by the piezo element.

21 Claims, 10 Drawing Sheets

US 8,254,161 B2

DEVICE THAT CAN BE RENDERED USELESS AND METHOD THEREOF

BACKGROUND

1. Field

This disclosure relates generally to semiconductors, and more specifically, to the security and functional use of semiconductors.

2. Related Art

Integrated circuits commonly use data elements that must be kept secret from unauthorized third parties. For example, banking cards should be maintained with the highest security available. The secret data elements are commonly contained in programmable non-volatile memories such as EEPROMs, EPROMs or flash EPROM. For these types of memories it is vital to prevent access to these data elements in all circumstances. Conventional techniques used to protect data elements of an integrated circuit include the use of encoding mask circuits, access protection circuits and secured software procedures for protecting access to the secure data elements.

Another technique which has been proposed to protect sensitive information in an integrated circuit is to render the integrated circuit useless should various forms of tampering be detected. Such forms include abnormal variation in ambient temperature, changes in the luminosity such as may occur from the depassivation of the integrated circuit, an abnormal level of a supply voltage, multiple abortive read or write attempts and others.

A type of semiconductor memories is known as Magnetoresistive Random Access Memory or MRAM. MRAM devices operate using magnetic tunnel junction devices. MRAM stores data as a magnetic state, rather than charge, and is sensed by measuring the resistance without disturbing the magnetic state. However, finding methods and circuitry to protect the security of data elements stored in MRAM devices is as problematic as with programmable non-volatile memories.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

There is herein provided methods and circuitry for rendering a device containing electronic circuitry, such as MRAM, useless or permanently non-functional. A render useless signal is generated in any of several ways described herein. In response, a magnetic field or a voltage is generated that affects the circuitry in a predetermined manner to render the MRAM useless.

Figure 1:
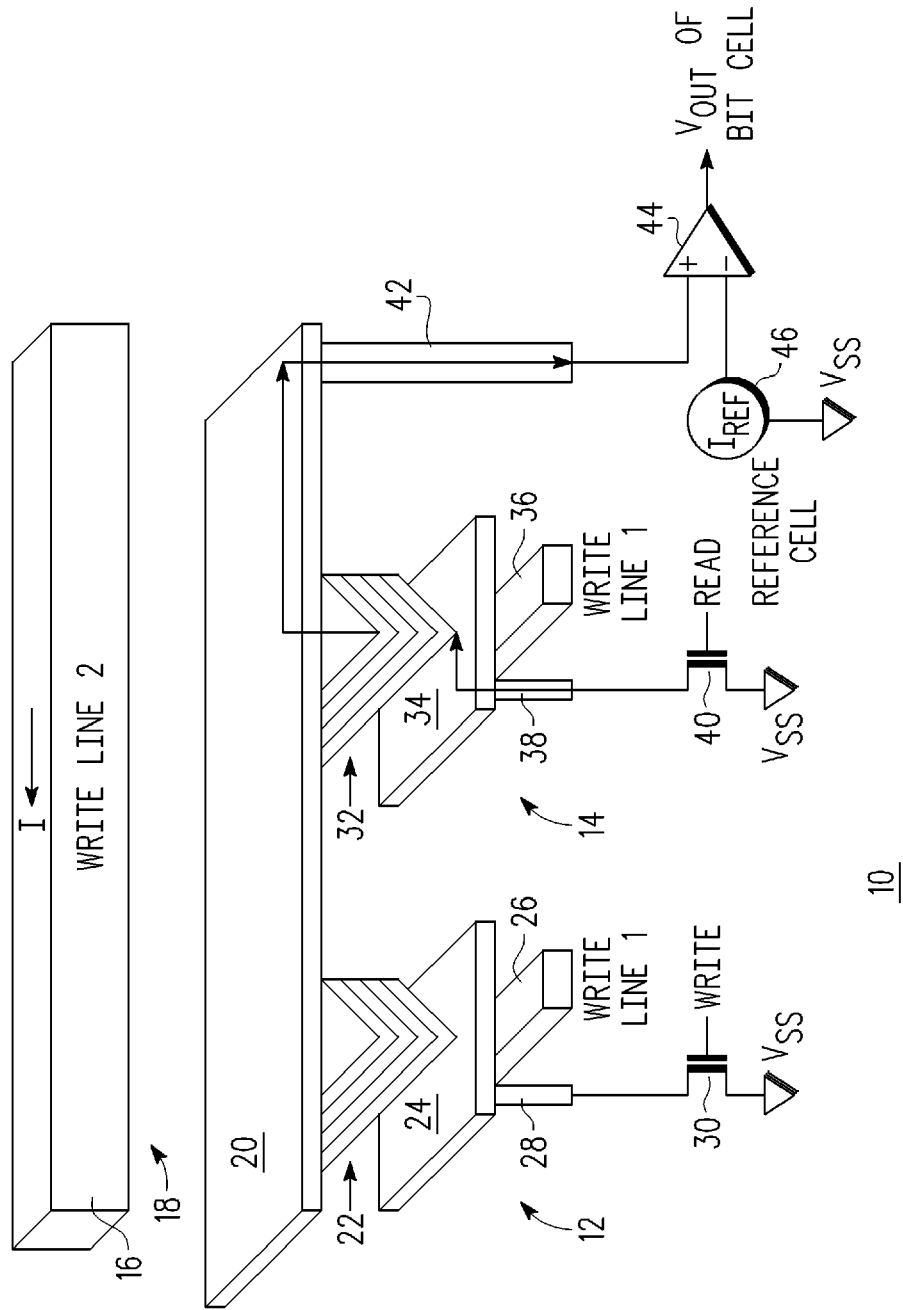
FIG. 1 illustrates in partial perspective form an MRAM storage device known in the art.

Illustrated in FIG. 1 is a conventional memory array 10 having MRAM memory cells 12 and 14. Within the memory array 10 is a write line conductor 16 labeled "write line 2" for conducting a current labeled "I". Below the write line conductor 16 is a dielectric layer 18. Underlying the dielectric layer 18 is a conductive line 20 overlying each of the memory cells 12 and 14. Memory cell 12 has a plurality of ferromagnetic layers 22 in contact with the conductive line 20 and overlying a conductive layer 24. Conductive layer 24 is overlying and in contact with a write line conductor 26 labeled "write line 1" that is perpendicular with the "write line 2". Connected perpendicular to the conductive layer 24 is a via 28 that connects to a drain of an N-channel select transistor 30. A gate of select transistor 30 is connected to a Write enable signal labeled "Write". A source of select transistor 30 is connected to a reference voltage terminal for receiving a reference voltage labeled $V_{SS}$. Memory cell 14 is laterally spaced from memory cell 12 and has a plurality of ferromagnetic layers 32 in contact with the conductive line 20 and overlying a conductive layer 34. Conductive layer 34 is overlying and in contact with a write line conductor 36 also labeled "write line 1" that is perpendicular with the "write line 2". Connected perpendicular to the conductive layer 34 is a via 38 that connects to a drain of an N-channel select transistor 40. A gate of select transistor 40 is connected to a Read enable signal labeled "Read". A source of select transistor 40 is connected to a reference voltage terminal for receiving a reference voltage labeled $V_{SS}$. Connected perpendicular to the conductive line 20 is a via 42 that is connected to a first or positive input of a comparator 44. A reference cell 46 has a first terminal connected to the reference voltage terminal for receiving $V_{SS}$ and has a second terminal connected to a second or negative input of comparator 44. An output of comparator 44 provides an output voltage of a selected bit cell (i.e. one of memory cell 12 or memory cell 14) labeled $V_{OUT}$.

In operation, memory array 10 of FIG. 1 is illustrated with memory cell 14 being connected for a read operation and memory cell 12 being connected for a write operation which occurs at separate points in time. For a read operation, a Read voltage makes select transistor 40 conductive which permits a current to flow through the memory cell 12 in proportion to the resistance of the ferromagnetic layers 32. The current is channeled through the memory array 10 to the signal input of comparator 44. The signal input current is compared with the reference current generated by the reference cell 46 to determine whether the memory cell 14 was programmed to a logic one or logic zero. The reference cell is a cell that is separate from memory array 10 and has a resistive value that generates a current to the comparator 44 that functions as a reference current for read operations. Comparator 44 provides an output voltage that is indicative of the logic value. For a write or program operation, select transistor 40 is not conductive and select transistor 30 is also non-conductive in response to the Write enable signal. Current that flows in a specified direction through the write line conductors 26 and 16 set up a magnetic field within the ferromagnetic layers 22 of memory cell 12. The magnetic field which is established by the two write lines will determine a specific resistive state which the ferromagnetic layers 22 assume. Upon completion of the write mode, the current is removed from each of the write line conductors 26 and 16. Because MRAM memory cells and their operation are common in the literature, further discussion of the operation of memory array 10 will not be detailed. The MRAM memory cells are nonvolatile and thus retain their stored data for indefinite periods of time and without power being required. As a result, the security of the information that is stored in memory array 10 is a concern should the integrated circuit containing memory array 10 be made available to an authorized third party.

Figure 2:
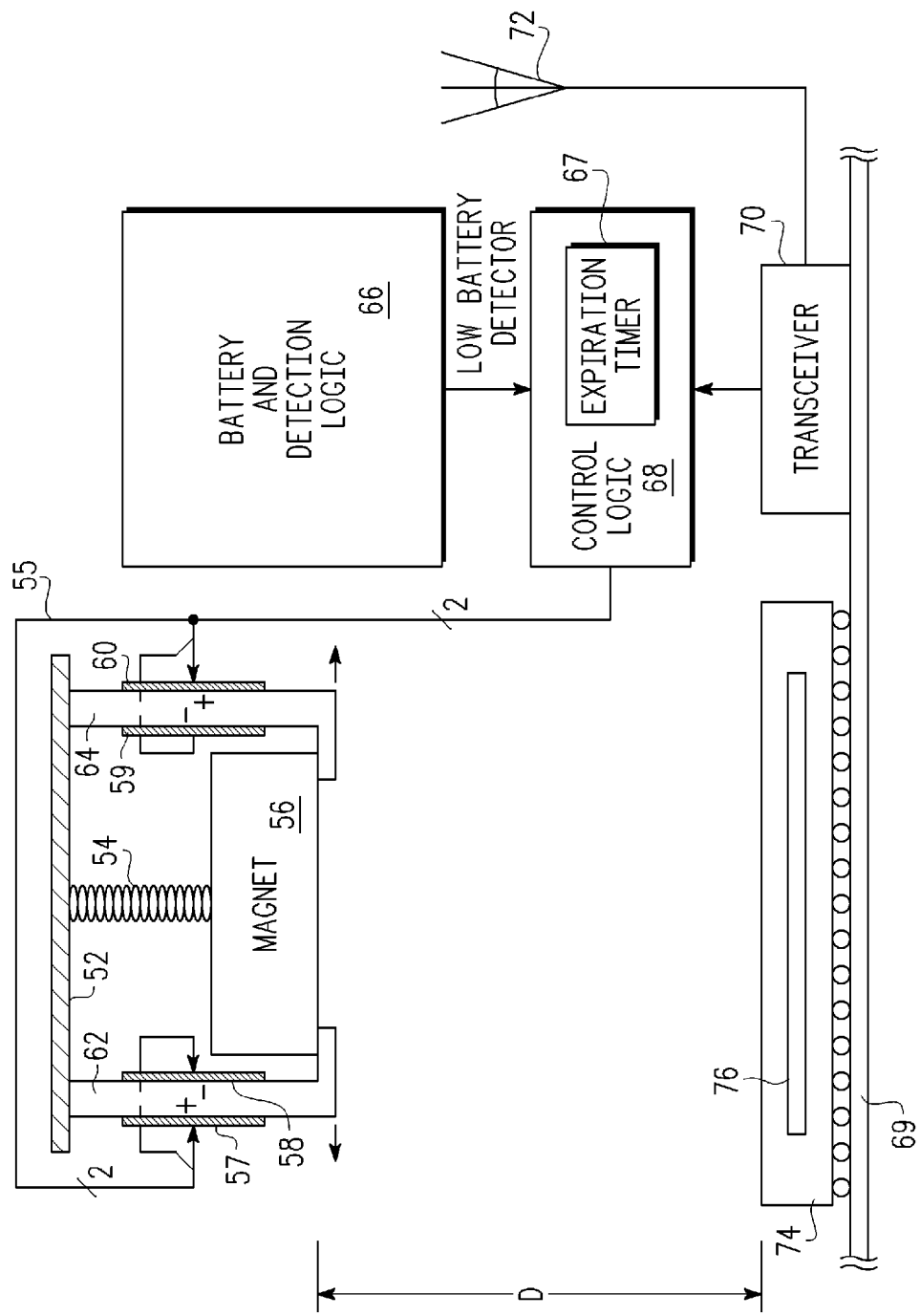
FIGS. 2 and 3 illustrate in partial block diagram form an MRAM-containing device capable of being rendered useless in accordance with one form of the present invention.

Illustrated in FIG. 2 is an MRAM-containing device 50 that can readily be rendered useless in one of several ways. The MRAM-containing device 50 has an anchor member 52 with a compressed spring 54 that is positioned in placed between the anchor member 52 and a magnet 56. In one form the magnet 56 is a conventional permanent magnet. In other forms the magnet 56 may be implemented with magnetized metal such as iron. The physical shape of the magnet 56 may also be varied and may be circular as well as rectangular or other geometric shapes. Holding the magnet 56 in place with the spring 54 that is compressed are the piezo elements 62 and 64. In one form the piezo elements 62 and 64 are "L" shaped positioned along each side of the magnet 56 so that the lower portion of the piezo elements 62 and 64 catch and retain the magnet 56 at a bottom surface of the magnet 56. Adjacent each side of the piezo element 62 are conductive electrodes 57 and 58. Conductive electrode 57 provides a positive bias to the piezo element 62 and conductive electrode 58 provides a negative bias to the piezo element 62. Similarly, adjacent each side of the piezo element 64 are conductive electrodes 59 and 60. Conductive electrode 58 provides a positive bias to the piezo element 64 and conductive electrode 59 provides a negative bias to the piezo element 64. Each of the conductive electrodes 57-60 receives a render useless signal from a control logic 68. The control logic 68 has a first input for receiving a Low Battery Detector signal from a battery and detection logic 66. The control logic 68 also has an expiration timer 67. A second input of the control logic 68 is connected to an output of a transceiver 70. An input/output terminal of the transceiver 70 is connected to an antenna 72. The antenna 72 may be implemented either as an integrated circuit antenna on a semiconductor die or may be an external antenna that is physically coupled to the transceiver 70. The transceiver 70 is positioned on a substrate 69. In one form the substrate 69 is a printed circuit board. Other materials may be used for the substrate 69. An integrated circuit 74 that contains a semiconductor die 76 having an MRAM array is also connected to the substrate 69 via a plurality of conductive bumps. The integrated circuit 74 may also be connected to the substrate 69 by other connection techniques such as a lead frame. In other forms the semiconductor die 76 may be connected directly to the substrate 69 and protected by a glob top or other insulating overlying material. In the illustrated form the magnet 56 is separated from the top of the integrated circuit 74 by a distance indicated as "D".

Figure 3:
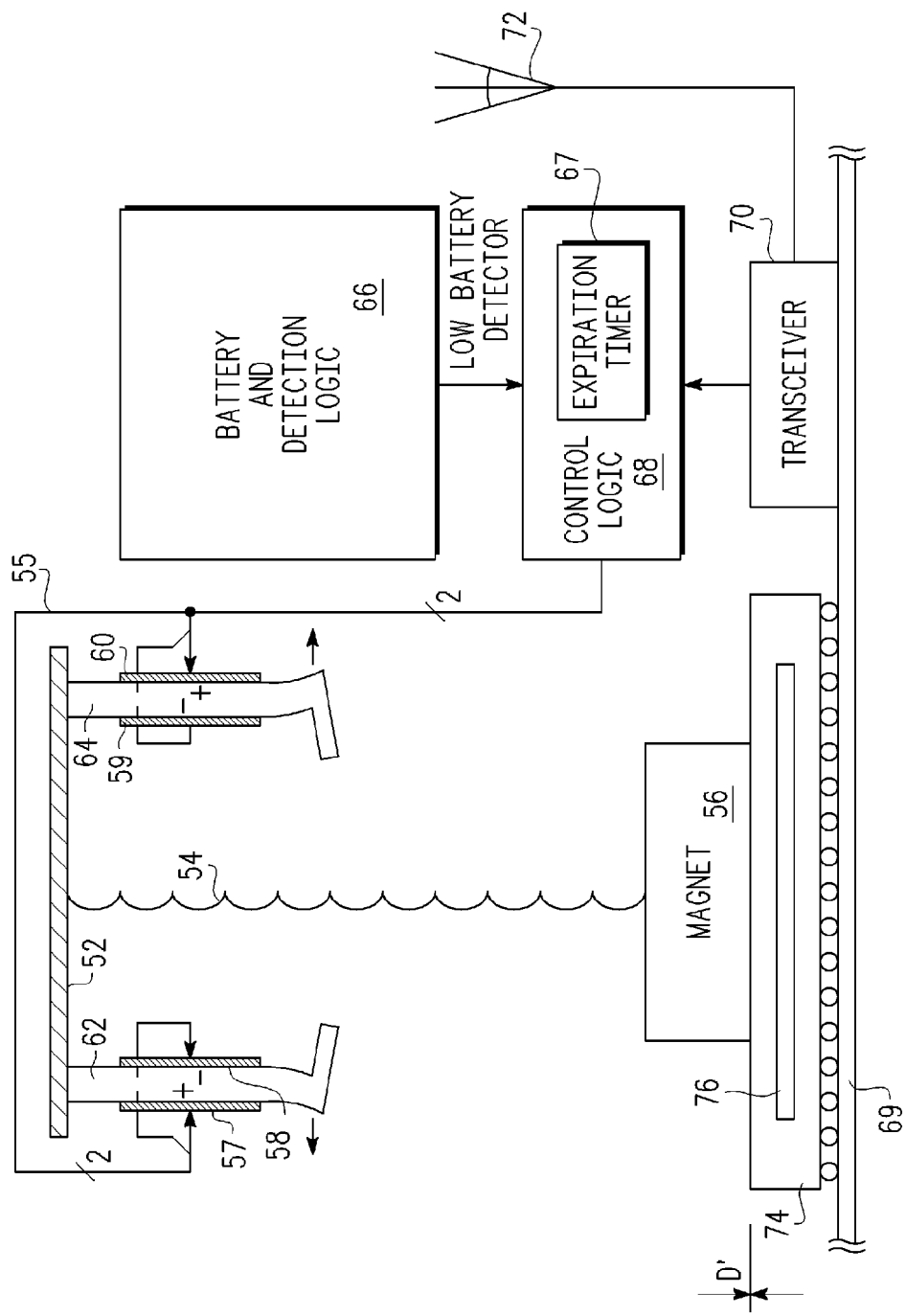

In operation, the separation distance D of the magnet 56 from the integrated circuit 74 functions to keep magnet 56 from affecting the operation of integrated circuit 74. Integrated circuit 74 contains an MRAM array that would be rendered useless when brought in close proximity to the magnet 56. The Render Useless signal 55 may be generated in one of several ways. In one form the Render Useless signal 55 is generated when a low voltage for the battery is detected by the battery and detection logic 66. In response to the Low Battery Detector signal, the control logic 68 activates the Render Useless signal by asserting a voltage to the conductive electrodes 57-60 respectively adjacent the piezo elements 62 and 64. The applied voltage to the piezo elements 62 and 64 causes the piezo elements 62 to deform in shape and laterally move outward as indicated by the arrows in FIG. 2. This action of the piezo elements 62 and 64 causes the magnet to be released from its position and the compressed spring 54 forces the magnet through the airspace separating the integrated circuit 74 from the magnet 56. The result is that magnet 56 comes to rest next to and, preferably, touching the integrated circuit 74 as illustrated in FIG. 3. The distance D therefore is eliminated and the separation distance D' illustrated in FIG. 3 is essentially zero. This movement of magnet 56 causes a relocation of its magnetic field and that relocation cuts across the magnetized data elements of the semiconductor die 76. The moving magnetic field affects at least the reference cells of all MRAM cells in the integrated circuit 74 by changing the resistance of the ferromagnetic layers as were described in FIG. 1. The moving magnetic field may also change the resistance of the ferromagnetic layers of memory cells that are not reference cells. In other words, the close positioning of the magnet 56 to magnetized data elements of the semiconductor die 76 further affects the magnetization of any magnetic-based data elements within the semiconductor die 76. As a result of the changed resistance in the reference cells of the MRAM, the data comparator will not provide accurate comparisons and the data therefore is rendered useless.

In another form the Render Useless signal is generated by the expiration timer 67 at a predetermined time period after application of the battery within the battery and detection logic 66 or after a predetermined activation event within the MRAM-containing device 50. One such activation event may be the receipt of a signal at a predetermined input of the integrated circuit 74. Other activation events may include the receipt of a command signal by the transceiver 70. Upon expiration of the time that was predetermined by the expiration timer 67, the control logic 68 generates the Render Useless signal 55 and magnet 56 is sprung to make contact or near-contact with the integrated circuit 74.

In yet another form the Render Useless signal is generated directly by an activation event that takes the form of receiving a remotely generated signal. The antenna 72 is capable of receiving various types of signals including radio frequency or optical signals such as a fiber optic or laser. Upon detection by transceiver 70 of the received signal, the control logic 68 generates the Render Useless signal and the piezo element distorts enough to release magnet 56 to make contact with or near-contact with the integrated circuit 74.

Figure 4:
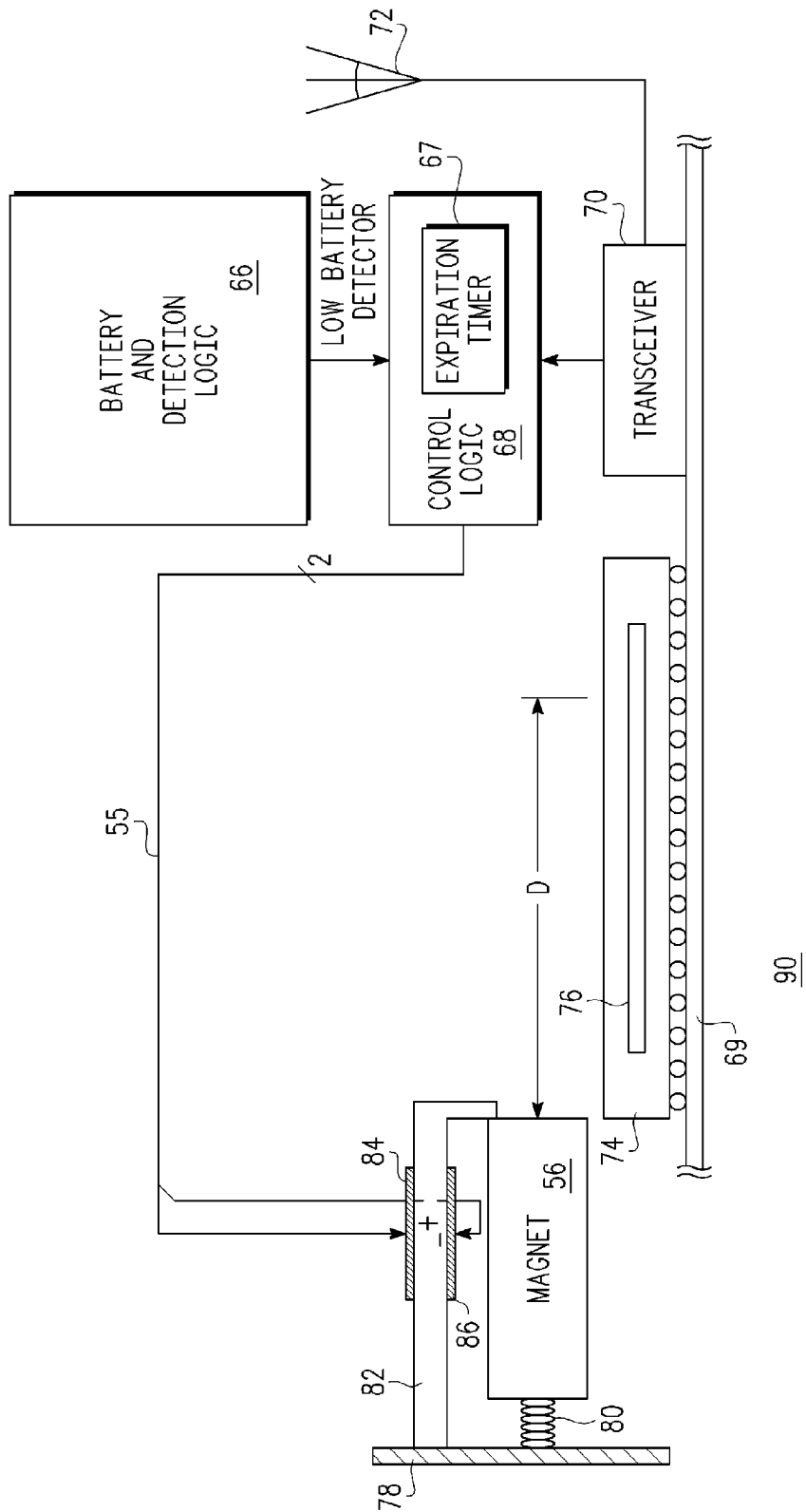
FIGS. 4 and 5 illustrate in partial block diagram form an MRAM-containing device capable of being rendered useless in accordance with another form of the present invention.

Illustrated in FIG. 4 is an MRAM-containing device 90 in accordance with another embodiment. For convenience of illustration, elements that are common with those illustrated in FIGS. 2 and 3 are provided with the same reference number. In this embodiment the magnet 56 is positioned lateral to and slightly above the integrated circuit. The magnet is attached to an anchor member 78 via a spring 80. A piezo element 82 is positioned to the anchor member 78 and adjacent the magnet 56 with an extension portion that locks the magnet in a secure manner with the spring 80 being compressed. Adjacent opposing sides of the piezo element 82 are conductive electrodes 84 and 86. Conductive electrode 84 is represented as being a positive electrode relative to conductive electrode 86 which is represented as a negative electrode. Connected to each of conductive electrodes 84 and 86 is a respective conductor of the two-conductor render useless signal. The spring 80 has a spring constant that is sufficient to cause the spring 80 to move the right-most edge of the magnet 56 by the distance D illustrated in FIG. 4. The spring constant and the size and weight of the magnet may be readily adjusted to accomplish the desired amount of lateral movement of the magnet 56.

Figure 5:
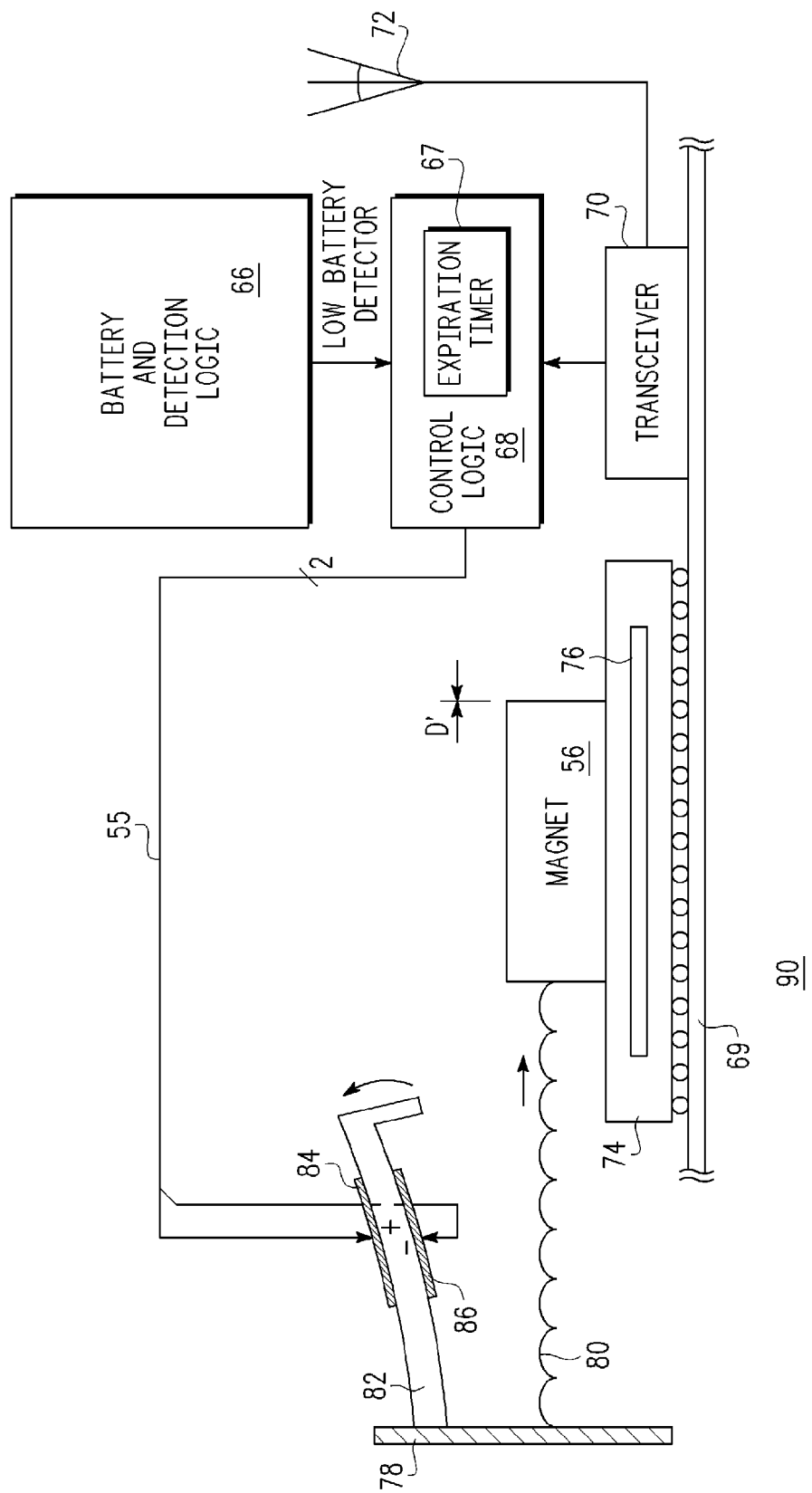

In operation, the render useless signal 55 is generated by the control logic 68 to place an electrical bias across the conductive electrodes 84 and 86. The electrical bias causes the piezo element 82 to bend from the position illustrated in FIG. 4 to the position illustrated in FIG. 5 in the direction noted by the arrow of piezo element 82. The magnet 56 is thrust laterally by the spring tension of the spring 80 in a direction as indicated by the lateral arrow of FIG. 5. As with the first embodiment, the movement of the magnet 56 causes a relocation of its magnetic field and that relocation cuts across the magnetized data elements of the semiconductor die 76. Additionally, the close positioning of the magnet 56 to the magnetized data elements of the semiconductor die 76 further affects the magnetization of any magnetic-based data elements within the semiconductor die 76. After the release of the magnet 56, the distance D in FIG. 4 becomes reduced to the illustrated distance D' which is substantially zero. The release of magnet 56 to affect the magnetization of magnetic-based data elements within the semiconductor die 76 renders those magnetic-based data elements useless. The render useless signal 55 is illustrated as a two-conductor signal and is generated in any of several methods as described in connection with the first embodiment. In particular, the battery and detection logic 66 may generate a low battery detector signal that causes the assertion of the render useless signal. The low battery detector signal should detect a low voltage value that is sufficiently large enough to permit adequate time for the control logic 68 and the piezo element 82 to function before the supply voltage becomes too low for this circuitry to function. Alternatively, the expiration timer 67 is set with a default count value to permit adequate time for the control logic 68 and the piezo element 82 to function before the supply voltage becomes too low for this circuitry to function. The expiration timer 67 begins counting when the battery of battery and detection logic 66 is connected and starts being used. In some forms a separate activation device (not shown), such as a pull ring may be used to activate the battery and thereby start the expiration timer 67. In another alternative, the transceiver 70 is used to receive a render useless signal via antenna 72. Upon receipt of a received render useless signal, the transceiver activates the control logic 68 which generates the render useless signal 55 for the purpose described above. Transceiver 70 may be implemented with global positioning hardware and/or software which transmits positional coordinates of the MRAM-containing device 90. A monitoring device (not shown) would monitor those coordinates and determine when, if at all, the render useless signal should be sent to the transceiver 70. It should be well understood that any two or all of the described methods used to generate the render useless signal 55 may be collectively used or that only one of the methods may be implemented.

Figure 6:
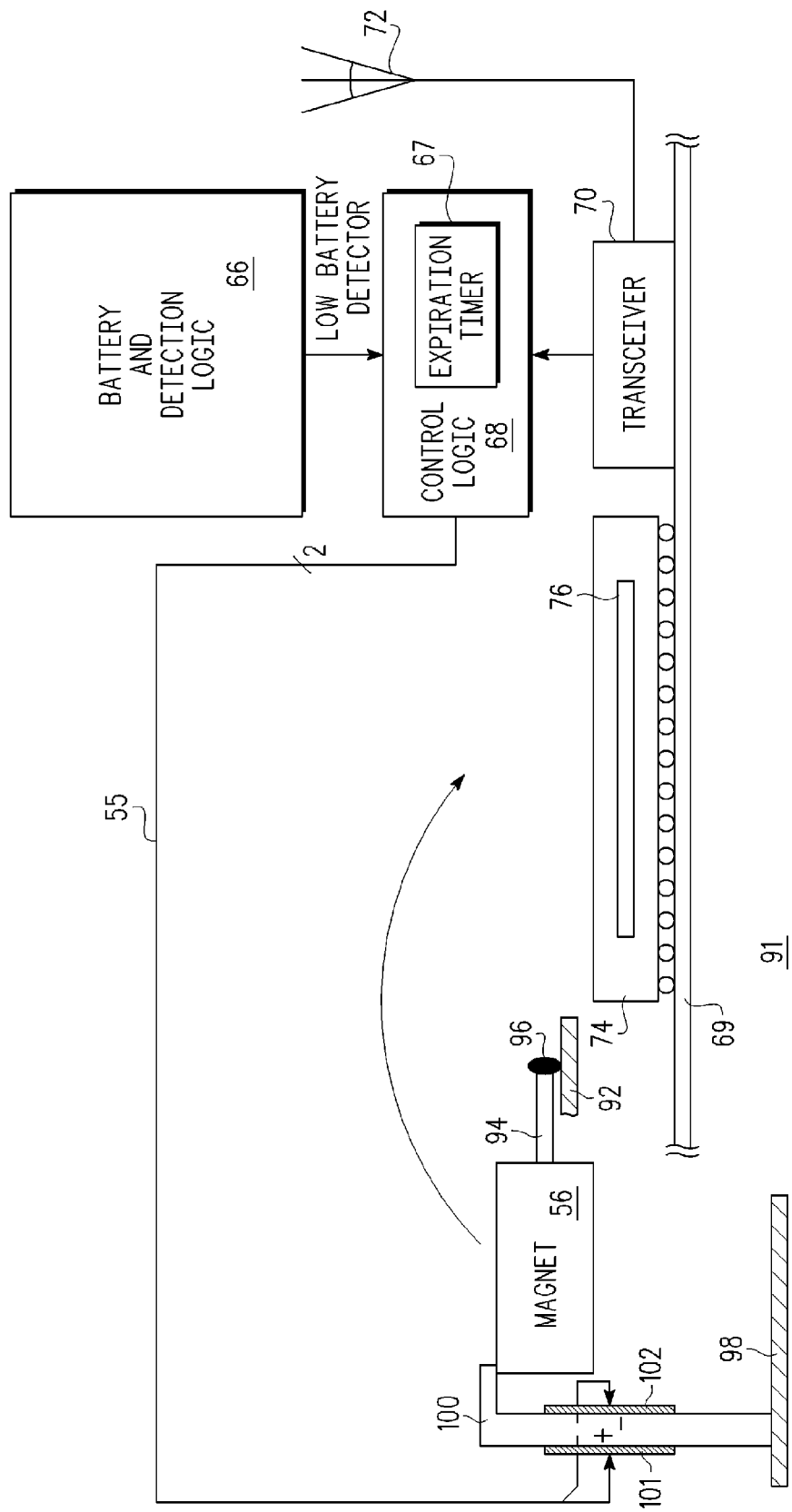
FIGS. 6 and 7 illustrated in partial block diagram form an MRAM-containing device capable of being rendered useless in accordance with yet another form of the present invention.

Illustrated in FIG. 6 is an MRAM-containing device 91 in accordance with another embodiment. For convenience of illustration, elements that are common with those illustrated in FIGS. 2-5 are provided with the same reference number. In this embodiment the magnet is positioned to pivot from and rotate relative to a pivot spring 96 at a pivot point positioned on an anchor member 92. The pivot spring 96 functions as a pivoting arm. The magnet 56 is connected to the pivot spring 96 via a pivot arm 94. An anchor member 98 provides a support base for a piezo element 100 that is connected to the anchor member at one end thereof. At an opposite end of the piezo element 100 is an extension section of the piezo element 100 that extends over a portion of a top surface of the magnet 56. Adjacent two opposite sides of the piezo element 100 are conductive electrodes 101 and 102 that respectively are connected to one of two conductors of the render useless signal 55. The conductive electrode 101 is more positive than the conductive electrode 102 which are respectively labeled with a "+" and a "−". The remaining elements of the MRAM-containing device 91 are connected and formed as described in the prior forms.

Figure 7:
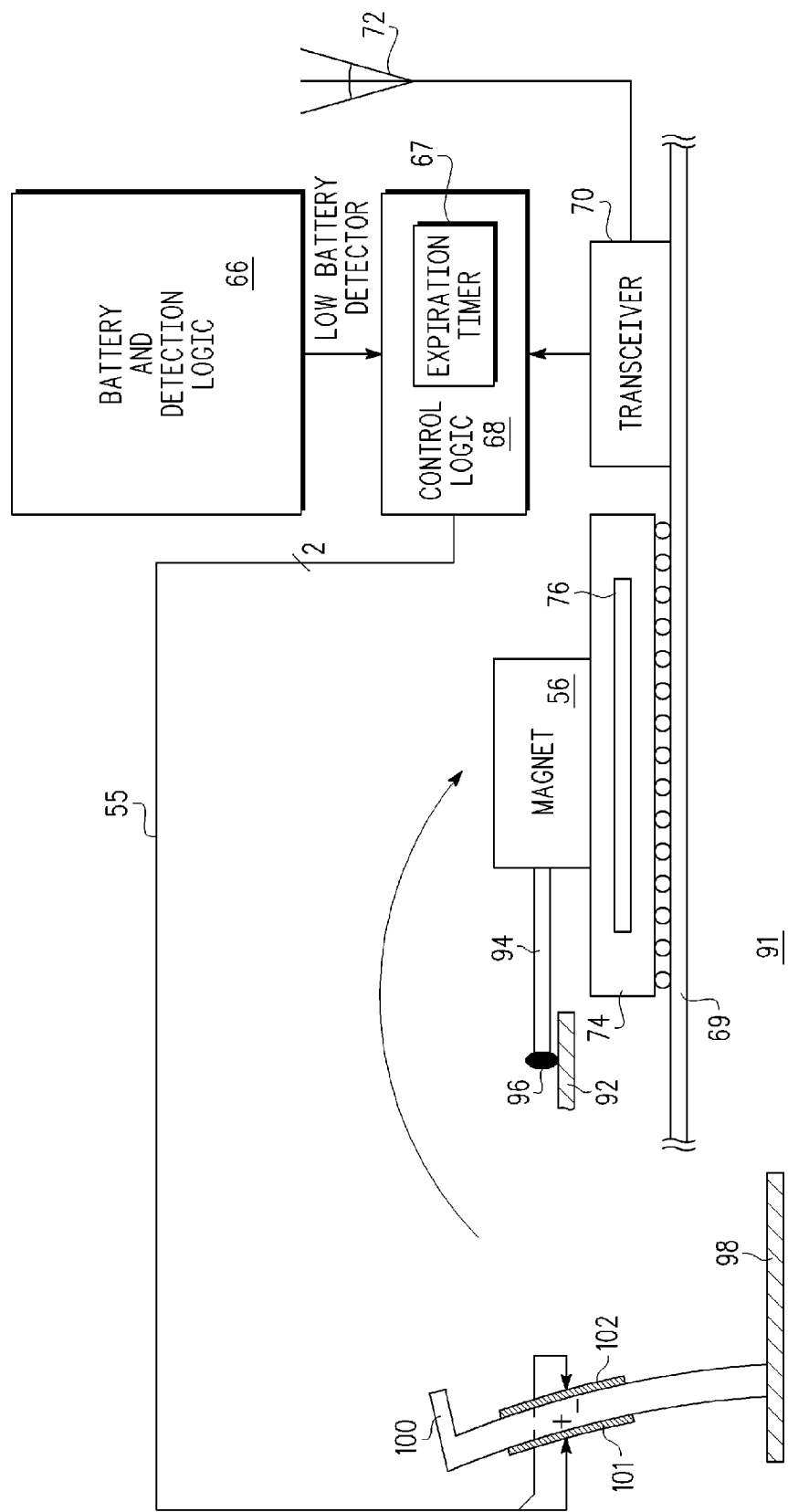

In operation, the render useless signal 55 may be generated by the expiration timer 67, the transceiver 70 and/or the low battery detector signal from the battery and detection logic 66. When the render useless signal 55 is generated, the piezo element 100 is moved toward the positive conductive electrode. As the piezo element 100 is displaced by the electrical bias applied on opposite sides thereof, the extension section of the piezo element 100 is removed from the top of magnet 56. Therefore there is no longer a restraining force applied to the magnet 56. The magnet 56 swings toward the packaged MRAM device within integrated circuit 74 about the pivot point on anchor member 92 to which the pivot spring 96 is attached as indicated by the arrow in FIG. 6. Illustrated in FIG. 7 is the resulting position of magnet 56 after the piezo element 100 has released the magnet 56. As with the first two embodiments, the movement of the magnet 56 causes a relocation of its magnetic field and that relocation cuts across the magnetized data elements of the semiconductor die 76. Additionally, the close positioning of the magnet 56 to the magnetized data elements of the semiconductor die 76 further affects the magnetization of any magnetic-based data elements within the semiconductor die 76. Thus a pivot spring 96 has been used to render the packaged MRAM device within integrated circuit 74 useless in response to any or a combination of: (1) a low battery voltage; (2) an elapse of a predetermined amount of time; (3) the receipt of a wireless signal via antenna 72.

Figure 8:
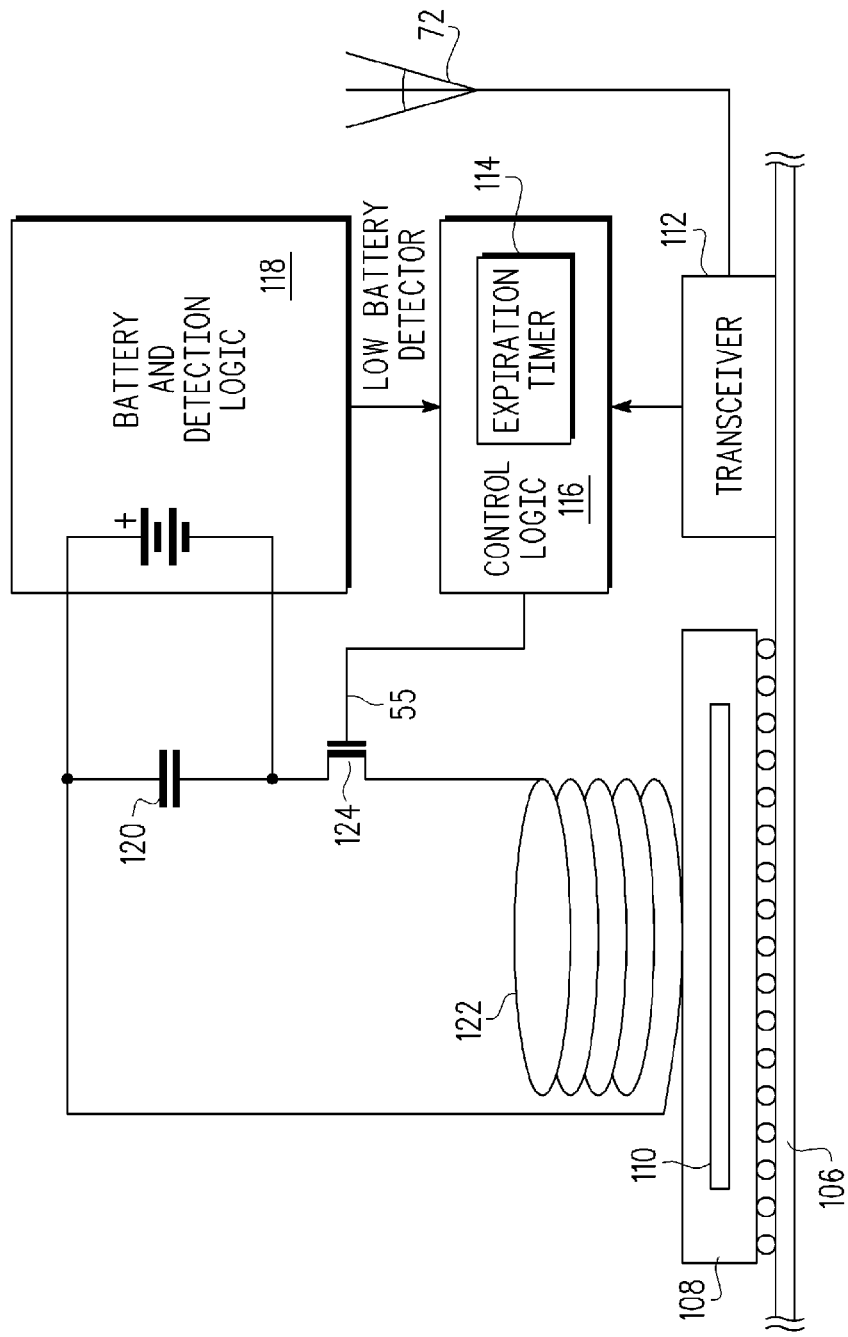
FIG. 8 illustrates in partial block diagram form an MRAM-containing device capable of being rendered useless in accordance with a further form of the present invention.

Illustrated in FIG. 8 is an MRAM-containing device 104 in accordance with yet another embodiment. A battery and detection logic 118 has a positive battery terminal connected to a first electrode of a capacitor 120 and to a first end of a coil 122. A negative battery terminal is connected to a second electrode of capacitor 120. An output of the battery and detection logic 118 is connected to a first input of control logic 116 which also has an expiration timer 114. An antenna 72 is connected to an input/output terminal of a transceiver 112. An output of transceiver 112 is connected to a second input of the control logic 116. An output of the control logic 116 is connected to a gate or control electrode of an N-channel transistor 124 for providing the render useless signal 55. A source of transistor 124 is connected to the negative terminal of the battery of battery and detection logic 118 and to the second electrode of the capacitor 120. A drain of transistor 124 is connected to a second end of the coil 122. In the illustrated form the coil 122 is a multiple loop of conductive wire. Other forms of the coil 122 may be implemented. The coil is positioned closely above an MRAM-containing integrated circuit 108 that contains a die 110 having MRAM. The MRAM-containing integrated circuit 108 has conductive bumps on an opposite side of the side in which the coil 122 is placed for connection to a substrate 106.

In operation, the battery of the battery and detection logic 118 charges capacitor 120 to a predetermined charge that is proportional to the value of the voltage of the battery. When the render useless signal 55 is not asserted the transistor 124 is not conductive. Thus capacitor 120 remains fully charged at the battery voltage potential. The render useless signal 55 may be asserted in response to any or a combination of: (1) a low battery voltage; (2) an elapse of a predetermined amount of time; (3) the receipt of a wireless signal via antenna 72. When any of these events occur the control logic 116 asserts the render useless signal 55 which makes the transistor 124 conductive. Although the battery of the battery and detection logic 118 is low, the charge of capacitor 120 functions to permit a substantial current to be conducted through coil 122. Thus capacitor 120 and transistor 124 and control logic 116 collectively function as enable logic circuitry to enable current to run through conducting coil 122. The conducting coil 122 generates a varying magnetic field which radiates across the MRAM cells that are contained within the MRAM-containing integrated circuit 108. The magnetic field will disrupt and magnetize the ferromagnetic layers, such as ferromagnetic layers 22 and 32 of FIG. 1, within the MRAM cells of MRAM-containing integrated circuit 108. The resulting magnetic flux from the magnetic field will permanently render the MRAM-containing integrated circuit 108 useless. As with the earlier described embodiments, the render useless signal 55 may be generated in response to the low battery detector signal, the expiration of time as counted by the expiration timer, and/or the receipt of a render useless signal by transceiver 112 via the antenna 72. Thus the MRAM-containing device 104 may be rendered useless under a variety of operating conditions and can be rendered useless either from completely self-contained methods or by external activation.

Figure 9:
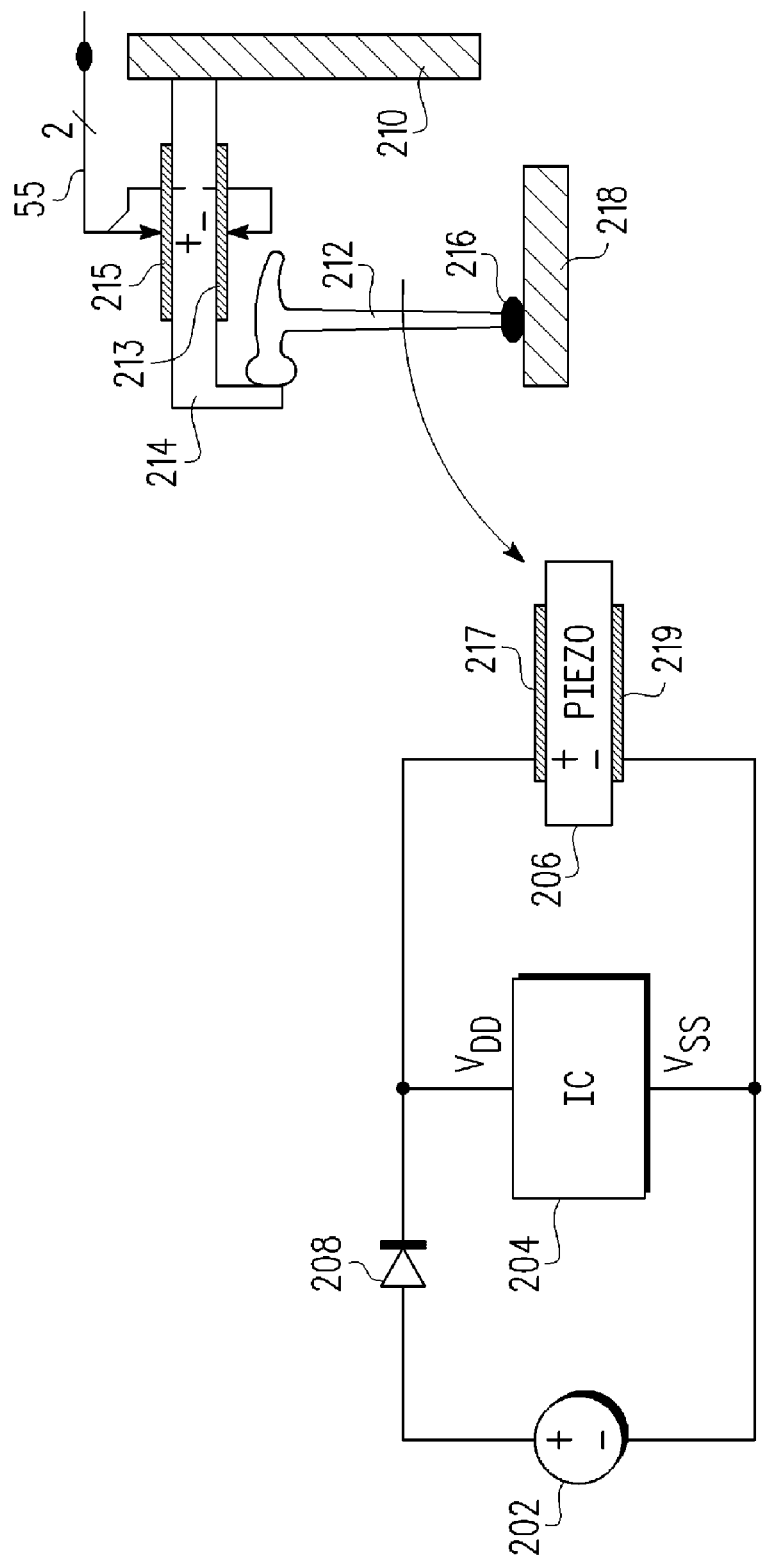
FIGS. 9 and 10 illustrate in a schematic perspective form an integrated circuit capable of being rendered useless in accordance with another form of the present invention.

Illustrated in FIG. 9 is another embodiment of a device, such as an integrated circuit 204, which can be rendered useless. In the illustrated form a battery 202 has a positive battery terminal connected to an anode of a diode 208. In one form the battery 202 is a portable or discrete battery. In other forms the battery 202 may represent a power source connected to a non-portable terminal. A cathode of diode 208 is connected to a positive voltage terminal, labeled $V_{DD}$, of integrated circuit 204 or IC 204. The integrated circuit 204 is any type of integrated circuit device and may or may not contain memory circuits. A negative battery terminal of battery 202 is connected to a negative voltage terminal, labeled $V_{SS}$, of integrated circuit 204. A piezo element 206 has two opposing surfaces that each have a conductive electrode attached thereto. A conductive electrode 217 is connected to a first side of the piezo element 206. A conductive electrode 219 is connected to a second side of the piezo element 206. The conductive electrode 217 is connected to the $V_{DD}$ voltage terminal, and the conductive electrode 219 is connected to the $V_{SS}$ voltage terminal. Positioned laterally adjacent and in close proximity to the piezo element 206 is an anchor member 218. A rotational spring 216 is positioned on the anchor member 218. On the rotational spring 216 is a mechanical actuator 212. In one form the mechanical actuator 212 is implemented with the general shape of a hammer or a mallet. It should be understood that other shapes and forms may be implemented for the mechanical actuator 212. The rotational spring 216 forces the mechanical actuator 212 in the direction of the arrow indicated in FIG. 9. Holding the mechanical actuator 212 in place and upright is an end of a piezo element 214. The piezo element 214 is held in place by an anchor member 210. The piezo element 214 has two opposing sides in which a conductive electrode is placed on either side. A conductive electrode 213 is placed on one side of the piezo element 214, and a conductive electrode 215 is placed on an opposing side of the piezo element 214. A two-conductor render useless signal 55 is connected to the conductive electrodes 213 and 215. A positive conductor of the render useless signal 55 is connected to the conductive electrode 215, and a negative (relative to the positive polarity) conductor is connected to the conductive electrode 213.

Figure 10:
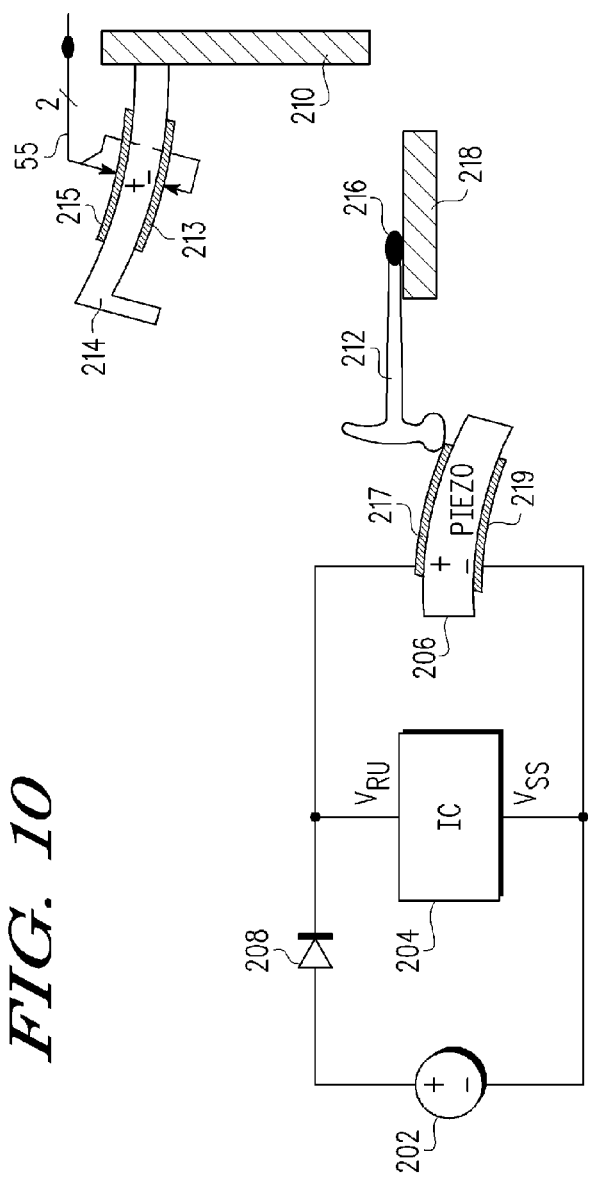

In operation the render useless signal 55 may be generated by any of the methods described in the previous first three embodiments. For example, the render useless signal 55 may be generated in response to any or a combination of: (1) a low battery voltage; (2) an elapse of a predetermined amount of time; (3) the receipt of a wireless signal via an antenna. Upon assertion of the render useless signal 55, the piezo element 214 is moved in the direction of the positive bias. In the illustrated form piezo element 214 moves upward as indicated in FIG. 10. Upon moving sufficiently high to release the mechanical actuator 212, the mechanical actuator 212 falls by the force of gravity. In an alternate embodiment, a spring or other stressed member may be used to cause sufficient movement of mechanical actuator 212. The mechanical actuator 212 hits and compresses or otherwise disturbs the piezo element 206 on the conductive electrode 217. The force of the impact on the piezo element 206 bends the piezo element 206 downward and creates a high voltage surge on the positive conductive electrode 217. The high voltage surge is similar to an electrostatic discharge (ESD) wherein a high voltage is applied to the power supply of the integrated circuit 204. This high voltage is sufficient to rupture the transistor gate oxide layers of a large number or all of the transistors contained within the integrated circuit 204. Alternatively, the high voltage is sufficient to rupture the transistor gate oxide layers of transistors implementing memory storage within the integrated circuit 204 or other critical transistor elements within integrated circuit 204. As a result of the gate oxide layer ruptures, the integrated circuit 204 is rendered useless. The diode 208 functions to prevent the voltage surge from the positive conductive electrode 217 from entering the battery 202. Thus there is herein provided a method to activate a mechanical actuator 212 for the purpose of remotely generating a voltage that is sufficient to render useless an integrated circuit. Because the force of nature that is being used to render the integrated circuit is voltage rather than a magnetic field, the integrated circuit can be any type of integrated circuit and not be limited to an integrated circuit containing an MRAM.

As an alternative to the embodiment of FIGS. 9 and 10, the mechanical actuator 212 and piezo element 206 may be replaced by moving a magnet through a coil as the source to generate a high voltage. The movement of the magnet through the coil would generate a voltage that is sufficient to rupture transistor gate oxides and render the integrated circuit 204 useless.

Figure 11:
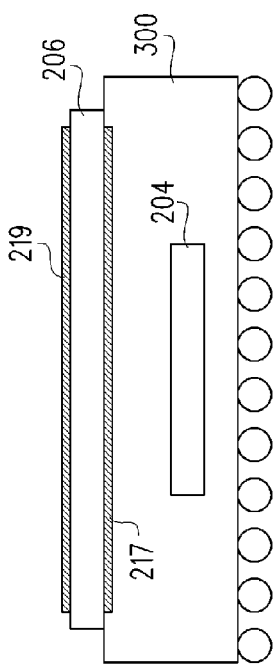
FIG. 11 illustrates in a perspective form an integrated circuit for use with the form illustrated in FIGS. 9 and 10.

Illustrated in FIG. 11 is a cross-sectional view of an integrated circuit package 300 containing integrated circuit 204 that is illustrated in FIGS. 9 and 10. The conductive electrode 217 is placed in direct contact with the integrated circuit package 300 and makes electrical contact to predetermined terminals of integrated circuit 204 by conductive vias (not shown). Above the conductive electrode 217 and in contact with the conductive electrode 217 is the piezo element 206. Above and in contact with the piezo element 206 is the conductive electrode 219.

It should be understood that the on-chip power distribution of integrated circuit 204 is designed to prevent inadvertent destruction from inadvertent contact with the piezo element 206 and some electrostatic discharge (ESD) circuitry is typically included. Additionally, the destruction of integrated circuit 204 must be damaging enough to render the integrated circuit 204 to be beyond repair by skilled experts. For example, if the disabling voltage created by the piezo element 206 blows or electrically disconnects a power supply bond wire, the integrated circuit 204 would still contain sensitive data that could be accessed by providing a new wire bond. In cases where the integrated circuit 204 only has a single supply voltage, the integrated circuit 204 can still be powered by I/O protection diodes. Therefore, in order to render integrated circuit 204 to a "useless" condition, the integrated circuit 204 should be damaged beyond repair, such as rupturing transistor gate oxides. In contrast with methods that open circuit fuses and antifuses, the use of a method for reliably damaging transistors with sensitive data will make circuits secure from unauthorized access by third parties.

By now it should be appreciated that there has been provided methods and structures to render an integrated circuit useless for security or other reasons. Various applications exist for these methods. Data stored in an MRAM or other circuitry desired to be rendered useless may include cryptographic keys, program variables, executable program code, sensor data or other security-sensitive information. By way of example only, integrated circuits may be rendered useless in television set top box products, in reconnaissance equipment and in products in which the product is intended to operate for only a specific, limited time and is desired not to be operable thereafter. While the various embodiments are described herein in connection with a portable battery, they may also be implemented using a permanently located power source.

A method for rendering a device containing a magnetoresistive random access memory (MRAM) useless is implemented by receiving a render useless signal which indicates whether or not the device is to be rendered useless. In response to the render useless signal indicating that the device is to be rendered useless, a magnetic field is created, wherein the magnetic field affects at least a reference cell of the MRAM to render the MRAM useless. In one form the magnetic field affects the reference cell of the MRAM by changing a resistance of the reference cell. In another form the magnetic field affects the reference cell of the MRAM by changing resistances of a plurality of storage cells within the MRAM. In another form the magnetic field is created by placing a permanent magnet sufficiently close to the MRAM to affect the reference cell of the MRAM. In another form the permanent magnet is placed sufficiently close to the MRAM to affect the reference cell of the MRAM by releasing a spring which, when released, physically moves the permanent magnet to be close enough to the MRAM to affect a resistance of the reference cell of the MRAM. In another form the physically moving is performed by a pivoting arm attached to the permanent magnet which pivots when the spring is released. In another form the spring is released by holding the spring with a piezo element and providing a voltage to the piezo element to compress the piezo element. In response to compressing the piezo element, the spring is released. In another form creating the magnetic field is performed by creating a current through a coil that is in close proximity to the MRAM such that the current through the coil creates the magnetic field which affects the at least the reference cell of the MRAM to render the MRAM useless. In another form the render useless signal is generated in response to a low battery detect signal of the device. In yet another form the render useless signal is generated in response to a timer of the device reaching a predetermined time. In yet another form the render useless signal is generated in response to a command received via an antenna of the device.

In another form there is herein provided an MRAM-containing device capable of being rendered useless that has an MRAM and control logic which provides a render useless signal. A conductive coil is placed in close proximity with the MRAM. Enable logic is coupled to the conductive coil, which, in response to assertion of the render useless signal, enables current to run through the conductive coil to create a magnetic field which affects at least a reference cell of the MRAM to render the MRAM useless. In one form the magnetic field changes a resistance of the reference cell. In another form the magnetic field changes resistances of a plurality of storage cells within the MRAM. In yet another form a low battery detection logic circuit provides a low battery detect signal. The control logic asserts the render useless signal in response to assertion of the low battery detect signal. In another form there is provided a timer, wherein the control logic asserts the render useless signal in response to the timer reaching a predetermined time. In another form there is provided an antenna and a transceiver coupled to the antenna and the control logic, wherein the control logic asserts the render useless signal in response to a command received via the antenna and transceiver of the device.

In another form there is provided a method for rendering a device useless. A piezo element is coupled to a voltage terminal of an integrated circuit of the device. A render useless signal is received. The piezo element is disturbed in response to the render useless signal indicating that the device is to be rendered useless. When disturbed, such as by being physically hit and displaced, the piezo element generates a voltage which is provided to the voltage terminal of the integrated circuit, the voltage being sufficiently high to destroy at least a portion of the integrated circuit. In another form the render useless signal is generated in response to a low battery detect signal of the device. In yet another form the render useless signal is generated in response to a timer of the device reaching a predetermined time. In another form the render useless signal is generated in response to a command received via an antenna of the device. In another form at least a portion of the integrated circuit is rendered useless by rupturing gate oxides of transistors within the at least a portion of the integrated circuit. In yet another form the piezo element is disturbed by releasing a mechanical actuator in response to the render useless signal indicating that the device is to be rendered useless, wherein, when released, the mechanical actuator compresses the piezo element.

In another form there is provided a device capable of being rendered useless having an integrated circuit and a piezo element coupled to a voltage terminal of the integrated circuit. Control logic generates a render useless signal. A mechanical actuator which, in response to the render useless signal indicating that the device is to be rendered useless, is released in order to compress the piezo element. The piezo element, when disturbed, generates a voltage which is provided to the voltage terminal of the integrated circuit, the voltage being sufficiently high to destroy at least a portion of the integrated circuit.

Although the invention has been described with respect to specific conductivity types or polarity of potentials, skilled artisans will appreciate that conductivity types and polarities of potentials may be reversed. Moreover, terms such as "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Although the invention is described herein with reference to specific embodiments, various modifications and changes can be made without departing from the scope of the present invention as set forth in the claims below. For example, various types of transistor memory storage cell circuits may be implemented and various types of memory, such as DRAM, SRAM and MRAM (magnetoresistive random access memory) may be used. Various logic gates that implement logic functions may be implemented to perform the described functionality. Devices other than piezo elements may be used to perform the function of being an actuated release mechanism. For example, a low power electromagnetic release mechanism may be used.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for rendering a device containing a magnetoresistive random access memory (MRAM) useless, the method comprising:
   receiving a render useless signal which indicates whether or not the device is to be rendered useless; and
   in response to the render useless signal indicating that the device is to be rendered useless, creating a magnetic field, wherein
      the magnetic field affects at least a reference cell of the MRAM to render the MRAM useless, and
      said creating the magnetic field comprises releasing a spring, which, when released, physically moves a permanent magnet sufficiently close to the MRAM to affect at least the reference cell of the MRAM.

2. The method of claim 1, wherein the magnetic field affecting the at least the reference cell of the MRAM comprises the magnetic field changing a resistance of the reference cell.

3. The method of claim 2, wherein the magnetic field affecting the at least the reference cell of the MRAM further comprises the magnetic field changing resistances of a plurality of storage cells within the MRAM.

4. The method of claim 1, wherein physically moving the permanent magnet is performed by a pivoting arm attached to the permanent magnet which pivots when the spring is released.

5. The method of claim 1, wherein the releasing the spring comprises:
   holding the spring with a piezo element; and
   providing a voltage to the piezo element to compress the piezo element, wherein, in response to compressing the piezo element, the spring is released.

6. The method of claim 1, further comprising:
   generating the render useless signal in response to a low battery detect signal of the device.

7. The method of claim 1, further comprising:
   generating the render useless signal in response to a timer of the device reaching a predetermined time.

8. The method of claim 1, further comprising:
   generating the render useless signal in response to a command received via an antenna of the device.

9. An MRAM-containing device capable of being rendered useless, comprising:
   an MRAM;
   control logic which provides a render useless signal;
   a conductive coil in close proximity with the MRAM; and
   enable logic coupled to the conductive coil, which, in response to assertion of the render useless signal, enables current to run through the conductive coil to create a magnetic field which affects at least a reference cell of the MRAM to render the MRAM useless.

10. The MRAM-containing device of claim 9, wherein the magnetic field changes a resistance of the reference cell.

11. The MRAM-containing device of claim 10, wherein the magnetic field changes resistances of a plurality of storage cells within the MRAM.

12. The MRAM-containing device of claim 9, further comprising:
   low battery detection logic which provides a low battery detect signal, wherein the control logic asserts the render useless signal in response to assertion of the low battery detect signal.

13. The MRAM-containing device of claim 9, further comprising:
   a timer, wherein the control logic asserts the render useless signal in response to the timer reaching a predetermined time.

14. The MRAM-containing device of claim 9, further comprising:
   an antenna; and
   a transceiver coupled to the antenna and the control logic, wherein the control logic asserts the render useless signal in response to a command received via the antenna and transceiver of the MRAM-containing device.

15. A method for rendering a device useless, comprising:
   providing a piezo element coupled to a voltage terminal of an integrated circuit of the device;
   receiving a render useless signal; and
   disturbing the piezo element in response to the render useless signal indicating that the device is to be rendered useless, wherein the piezo element, when disturbed, generates a voltage which is provided to the voltage terminal of the integrated circuit, the voltage being sufficiently high to render useless at least a portion of the integrated circuit.

16. The method of claim 15, further comprising:
   generating the render useless signal in response to a low battery detect signal of the device.

17. The method of claim 15, further comprising:
   generating the render useless signal in response to a timer of the device reaching a predetermined time.

18. The method of claim 15, further comprising:
   generating the render useless signal in response to a command received via an antenna of the device.

19. The method of claim 15, wherein rendering useless the at least a portion of the integrated circuit comprises rupturing gate oxides of transistors within the at least a portion of the integrated circuit.

20. The method of claim 15, wherein the compressing the piezo element comprises:
   releasing a mechanical actuator in response to the render useless signal indicating that the device is to be rendered useless, wherein, when released, the mechanical actuator disturbs the piezo element.

21. A device capable of being rendered useless, comprising:
- an integrated circuit;
- a piezo element coupled to a voltage terminal of the integrated circuit;
- control logic which generates a render useless signal; and
- a mechanical actuator which, in response to the render useless signal indicating that the device is to be rendered useless, is released in order to disturb the piezo element, wherein the piezo element, when disturbed, generates a voltage which is provided to the voltage terminal of the integrated circuit, the voltage being sufficiently high to destroy at least a portion of the integrated circuit.

* * * * *